W. R. SEATON.
SAW CLAMP.
APPLICATION FILED MAY 17, 1912.
1,048,898.
Patented Dec. 31, 1912.
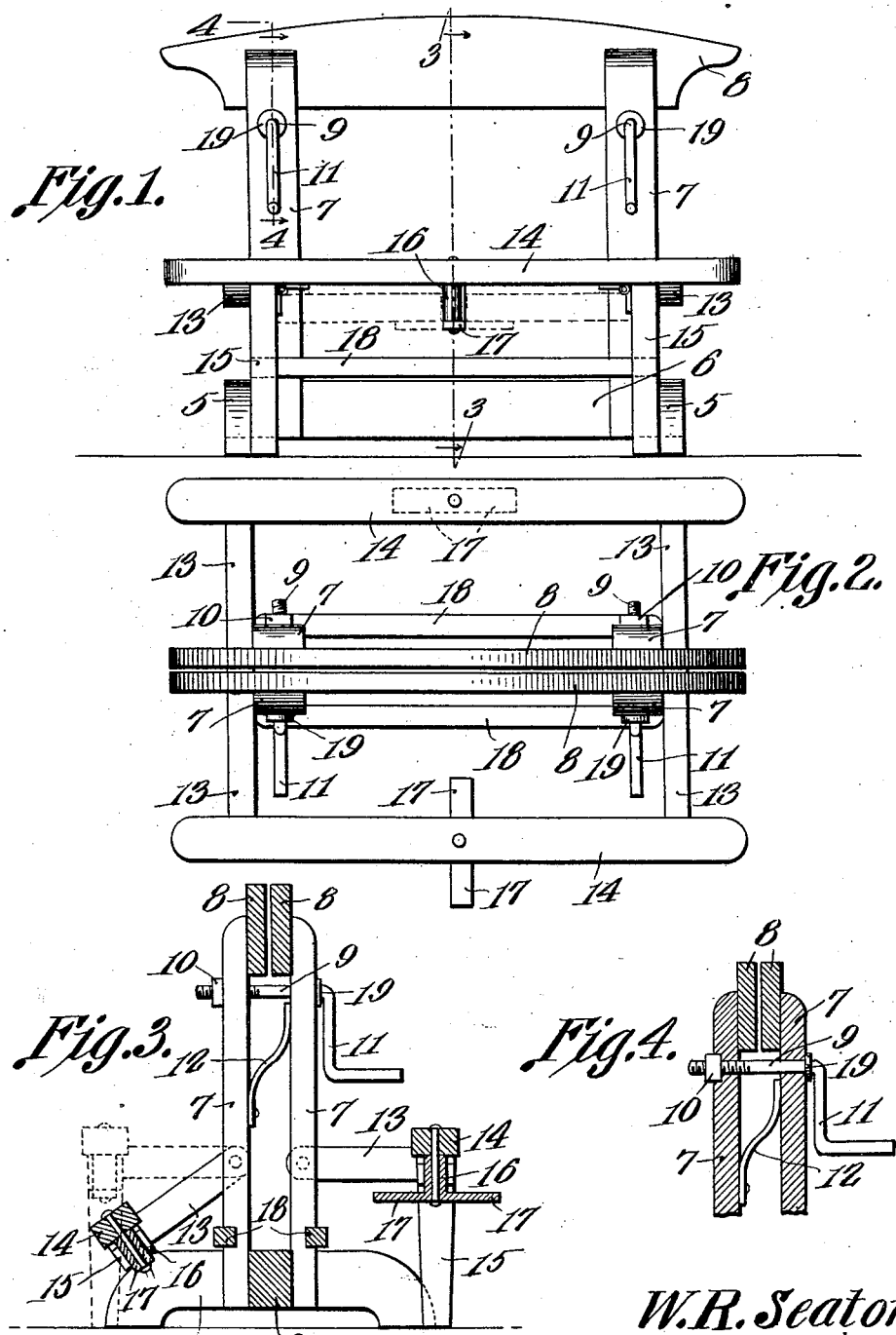
W. R. Seaton, Inventor
by C. A. Snow & Co., Attorneys

UNITED STATES PATENT OFFICE.

WILLIAM R. SEATON, OF PINSON, TENNESSEE.

SAW-CLAMP.

1,048,898.   Specification of Letters Patent.   Patented Dec. 31, 1912.

Application filed May 17, 1912. Serial No. 698,055.

*To all whom it may concern:*

Be it known that I, WILLIAM R. SEATON, a citizen of the United States, residing at Pinson, in the county of Madison and State of Tennessee, have invented a new and useful Saw-Clamp, of which the following is a specification.

This invention relates to saw clamps, and aims to provide a device of this character which is portable so that it may be readily conveyed about for use by woodmen and others, which is simple, substantial, durable and inexpensive in construction and which is convenient, serviceable and efficient in use.

The present invention also contemplates a device of the character indicated which may be employed for holding and clamping cross cut saws, and hand saws, and which shall be provided with collapsible or folding seats at its sides upon which the operator or operators may seat when filing the saw teeth.

With the foregoing and other objects in view, which will be apparent as the invention is better understood, this invention resides in the novel construction and combination of parts hereinafter set forth and particularly pointed out in the appended claims, it being understood that this device is susceptible of alterations or deviations within its details, such as changes in sizes, proportions, materials and the like, without departing from the spirit of the invention.

The invention is illustrated in its preferred embodiment in the accompanying drawing, wherein like reference characters have been employed to denote corresponding parts, and wherein:—

Figure 1 is a side elevation of the saw clamp. Fig. 2 is a plan view thereof. Fig. 3 is a sectional view taken on the line 3—3 of Fig. 1. Fig. 4 is a sectional detail taken on the line 4—4 of Fig. 1.

Referring specifically to the drawings, the numeral 6 designates a beam, which has the double feet 5 secured to the ends thereof, the said parts forming the base or frame of the clamp. A pair of standards 7 are secured to each side of the beam 6 adjacent the ends thereof, these standards being of any preferred length, and being resilient or flexible to a suitable degree, and co-acting jaws 8 are carried by the upper ends of the respective pairs of standards. Nuts 10 are embedded or inset in the outer faces of one pair of standards adjacent their upper ends, and screws 9 are passed loosely through the other pair of standards, adjacent their upper ends and are engaged through the nuts 10, the said screws having collars 19 secured thereon which bear against the outer faces of the latter pair of standards, and the screws 9 have their corresponding ends formed into cranks 11. Leaf springs 12 are secured to one pair of standards 7 and contact with the other pair of standards so as to yieldingly force the pairs of standards apart.

From the foregoing, it will be seen that by rotating the screws 9 in the proper direction by means of the cranks 11, the respective pairs of standards may be moved together in order to clamp a saw between the jaws 8, and when the screws 9 are loosened or unscrewed, the springs 12 will force the respective pairs of standards apart in order to free the saw. The jaws 8 may be employed for clamping either a cross cut saw or one or two hand saws, it being noted that the screws 9 being adjacent the upper ends of the standards form seats for cross cut saws.

In order to provide the seat attachments, an arm 13 has been pivoted to each standard 7, the respective pairs of arms 13 projecting toward the respective sides of the device, and seats 14 being secured to the free ends of the respective pairs of arms. Legs 15 are hinged to the seats 14 adjacent their ends and are foldable inwardly against the seats. Members 16 are pivoted to the seats intermediate the legs 15 and have oppositely projecting catches 17 which are engageable with the free ends of the legs 15 when the same are in folded position. A bar 18 is also secured to each pair of standards 7 adjacent their lower ends, thereby forming a foot rest. It will therefore follow, that the seats 14 may be compactly folded against the standards 7 when not in use, and may be extended or folded outwardly to be brought into operative position, in which event, the legs 15 may be freed by turning the members 16, so that the legs may swing downward so as to support the seats. The legs 15 are preferably designed to swing against the double feed 5. Thus, when the seats are brought into operative position, the operator or operators may seat thereon in order to file the teeth of the saw clamped between the jaws 8, or the seats may be folded upwardly or downward when the device is to be conveyed about, or when it is not desired to employ the seats, as when filing the saw teeth while standing. The arms 13 may also be detached from the standards 7 so that the device may be employed without the use of the seats 14, in which event, the standards 7 are preferably of such a length that the saw teeth may be filed conveniently while the operator is in standing posture.

The advantages of the present device are manifest and need not be itemized at length, and it will be noted that the objects aimed at are attained by the structure herein disclosed.

Having thus described the invention, what is claimed as new is:—

1. A saw clamp embodying a beam, double feet secured to the ends thereof, a pair of standards secured to each side of the beam adjacent the ends thereof, co-acting jaws carried by the upper ends of the respective pairs of standards, means for drawing the respective pairs of standards together, means for yieldingly separating the upper ends of the respective pairs of standards, arms pivoted to the standards, seats carried by the respective pairs of arms, and legs hinged to the seats.

2. A saw clamp embodying a beam, double feet secured to the ends thereof, a pair of standards secured to each side of the beam adjacent the ends thereof, co-acting jaws carried by the upper ends of the respective pairs of standards, means for drawing the respective pairs of standards together, means for yieldingly separating the upper ends of the respective pairs of standards, arms pivoted to the standards, seats secured to the free ends of the respective pairs of arms, legs hinged to the seats adjacent their ends and foldable inwardly against the seats, and members pivoted to the seats intermediate the legs and having opositely projecting catches engageable with the free ends of the legs when in folded position.

In testimony that I claim the foregoing as my own, I have hereto affixed my signature in the presence of two witnesses.

WILLIAM R. SEATON.

Witnesses:
JAMES P. SMITH,
W. H. DISMUKES.

---

Copies of this patent may be obtained for five cents each, by addressing the "Commissioner of Patents, Washington, D. C."